US006979722B2

(12) United States Patent
Hamamoto et al.

(10) Patent No.: US 6,979,722 B2
(45) Date of Patent: Dec. 27, 2005

(54) PROCESS FOR PRODUCTION OF ALKYLLENE OXIDE POLYMERS

(75) Inventors: Shigeki Hamamoto, Himeji (JP); Nobutaka Fujimoto, Himeji (JP); Makoto Katou, Himeji (JP); Kazuyuki Miura, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 50 days.

(21) Appl. No.: 10/469,736

(22) PCT Filed: Mar. 5, 2002

(86) PCT No.: PCT/JP02/02046

§ 371 (c)(1),
(2), (4) Date: Sep. 3, 2003

(87) PCT Pub. No.: WO02/070585

PCT Pub. Date: Sep. 12, 2002

(65) Prior Publication Data

US 2004/0087718 A1   May 6, 2004

(30) Foreign Application Priority Data

Mar. 7, 2001 (JP) .............................. 2001-063297

(51) Int. Cl.[7] ............................................ C08G 59/68
(52) U.S. Cl. ...................... 528/414; 528/409; 528/410; 528/411; 528/412; 528/413; 528/421; 523/440; 523/463
(58) Field of Search ................................ 528/408, 409, 528/410, 411, 412, 413, 414, 421; 523/440, 523/463

(56) References Cited

U.S. PATENT DOCUMENTS 3,697,496 A * 10/1972 Ueno et al. ................. 526/186
5,326,852 A    7/1994 Fujikake et al.
5,480,928 A * 1/1996 Stratta et al. ................ 524/386

FOREIGN PATENT DOCUMENTS

| EP | 0 239 973 | 10/1987 |
|---|---|---|
| JP | 45-7751 | 3/1970 |
| JP | 47-043198 | 12/1972 |
| JP | 53-27319 | 8/1978 |
| JP | 61-162522 | 7/1986 |
| JP | 62-232433 | 10/1987 |
| JP | 5-17566 | 1/1993 |
| JP | 10-195190 | 7/1998 |
| JP | 2002-105195 | 4/2002 |

OTHER PUBLICATIONS

Machine Translation, JP 10-195190, Nishio, Jul. 28, 1998.*

* cited by examiner

Primary Examiner—Randy Gulakowski
Assistant Examiner—Christopher Keehan
(74) Attorney, Agent, or Firm—Hamre, Schumann, Mueller & Larson, P.C.

(57) ABSTRACT

According to a process for production of alkylene oxide polymers offered by the present invention, an alkylene oxide is subjected to a polymerization reaction under presence of a catalyst in a solvent containing an aliphatic hydrocarbon having from five to seven carbon atoms and a branched structure. The aliphatic hydrocarbon is provided preferably by 2-methyl pentane, 3-methyl pentane, 2,3-dimethyl pentane, 2,4-dimethyl pentane, etc. The alkylene oxide is provided preferably by ethylene oxides and/or propylene oxides.

7 Claims, No Drawings

PROCESS FOR PRODUCTION OF ALKYLLENE OXIDE POLYMERS

TECHNICAL FIELD

The present invention relates to a process for production of alkylene oxide polymers.

BACKGROUND ART

Alkylene oxide polymers are products of polymerization of alkylene oxide. In general, they are water soluble polymers superb in promoting coagulation, dispersion, increased viscosity and so on. Because of these functions, the alkylene oxide polymers are utilized widely in such applications as pulp dispersion agents, resin modifiers, binders, coagulants, detergents, foods, personal care products, hygiene materials, cosmetics, medicines and quasi-medicines.

Alkylene oxide is a chemical compound having an ether ring structure shown in the following structural formula I:

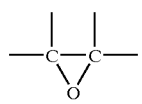

(I)

Typical alkylene oxides include ethylene oxide shown in the structural formula II and propylene oxide shown in the structural formula III:

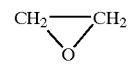

(II)

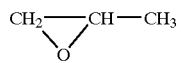

(III)

Polymerization of alkylene oxide is promoted by a variety of polymerization initiators or catalysts such as alkalis, boron trifluoride, oxides of alkaline earth metals, and organic metal compounds. When ethylene oxide for example is polymerized, polymers having a structure shown in the following formula IV are produced:

(IV)

It is known that polymerization reaction of the alkylene oxide differs in terms of degree of polymerization and/or rate of polymerization depending on the kind of catalyst utilized. For example, when the catalyst is a product obtained by reaction of an organic compound of Zn or Al with alcohol, the resulting polymerization reaction is a coordination polymerization and resulting alkylene oxide polymers have a relatively high degree of polymerization. Backed by such knowledge, research and development efforts have been concentrated so far on improvement of catalysts in view of increased rate of reaction and yield.

For example, the Japanese Patents Nos. 45-7751 and 53-27319 disclose that when an organic zinc compound is reacted with multifunctional compounds (such as polyhydric alcohols, polyhydric thiols, polyhydric phenols and polyhydric thiophenols) and then with a monohydric alcohol, the obtained product acts as a superb catalyst in the alkylene oxide polymerization reaction. Also, the Japanese Patent Laid-open No. 62-232433 discloses that when an organic zinc compound and a polyhydric alcohol are reacted with each other under contact with fine particles of metal oxides and a nonionic surfactant, the obtained product acts as a superb catalyst in the alkylene oxide polymerization reaction. Whichever catalyst is utilized, the alkylene oxide polymerization reaction is made in an n-hexane solvent.

The above Japanese Patents Nos. 45-7751 and 53-27319 disclose processes for production capable of obtaining alkylene oxide polymers having a relatively high degree of polymerization, since the catalysts prepared as described above serves-in homopolymerization of an alkylene oxide or copolymerization of two or more kinds of alkylene oxides. However, there are problems with the processes disclosed by these documents. Specifically, the rate of polymerization is low, and the yield is insufficient. Further, reproducibility of the degree of polymerization in the obtained polymers is relatively low. In addition, the product of polymerization sometimes becomes massive, which makes stable industrial production difficult.

On the other hand, according to a process for production disclosed in the Japanese Patent Laid-open No. 62-232433, reproducibility of the degree of polymerization in the obtained polymers is relatively good, but catalyst preparation requires a very complex operation, and rate of polymerization is relatively low.

DISCLOSURE OF THE INVENTION

It is therefore an object of the present invention to provide a process for efficiently producing alkylene oxide polymers.

According to a process for production of alkylene oxide polymers offered by the present invention, an alkylene oxide is subjected to a polymerization reaction under presence of a catalyst in a solvent containing an aliphatic hydrocarbon having from five to seven carbon atoms and a branched structure.

As described earlier, research and development efforts in the past were primarily focused on improvement of catalysts in alkylene oxide polymerization reaction in view of increased rate of reaction. These efforts were commonly based on the use of n-hexane, which is a straight chain aliphatic hydrocarbon, to be used as a solvent for the polymerization reaction as disclosed in the Japanese Patents Nos. 45-7751 and 53-27319 as well the Japanese Patent Laid-Open 62-232433.

In contrast to this, the inventors of the present invention found that in the alkylene oxide polymerization system, reaction efficiency is heavily dependent not only upon the catalyst but also upon the solvent. Specifically, in a comparative study of two alkylene oxide polymerization reactions using the same catalyst, it was found that when the solvent was provided by an aliphatic hydrocarbon having 5–7 carbon atoms with a branched structure, the polymerization reaction completes within a very short period of time with a high yield of alkylene oxide polymers as compared to a case where the solvent was provided by n-hexane which is a straight chain aliphatic hydrocarbon having 6 carbon atoms. No clear knowledge has been obtained as for how the polymerization reaction is completed in such a short time or how the yield of the polymers can be so high. The inventors discuss that due to a bulky molecular structure of the C5–C7 aliphatic hydrocarbon having a branched structure, intermolecular gaps can develop easily, which help catalyst coordination with an end of the growing chain of alkylene oxide polymers or with alkylene oxide monomers. Further, the gaps can also help insertion of the catalyst-coordinated monomers into a space between the catalyst and an end of the growing chain of alkylene oxide polymers.

According to the present invention, the process has sufficient control on the polymerization, preventing the alkylene oxide polymers from becoming massive. Therefore, the alkylene oxide polymers can be easily separated from the solvent in the form of fine granules. For example, the alkylene oxide polymers can be separated from the solvent by e.g. filtration, centrifugation and decantation, and then dried in a hot-air drier, vacuum drier and so on. Alternatively, the solvent may be removed by distillation.

The alkylene oxide for use according to the present invention-can be any of ethylene oxide, propylene oxide, butylene oxide, cyclohexene oxide, styrene oxide, epichlorohydrine and glycidylether epoxide compounds. Among others, in view of obtaining useful polymers, ethylene oxide and propylene oxide are preferable.

The aliphatic hydrocarbon having 5–7 carbon atoms and a branched structure for use according to the present invention can be any of 2-methyl butane, 2,2-dimethyl butane, 2,3-dimethyl butane, 2-methyl pentane, 3-methyl pentane, 2,2-dimethyl pentane, 3,3-dimethyl pentane, 2,3-dimethyl pentane, 2,4-dimethyl pentane, 2-methyl hexane and 3-methyl hexane. Among others, in view of a quicker progress of the polymerization reaction, 2-methyl pentane, 3-methyl pentane, 2,3-dimethyl pentane and 2,4-dimethyl pentane are preferable. The present invention, however, also allows the use of unsaturated aliphatic hydrocarbons in place of or together with the saturated aliphatic hydrocarbons listed above, as long as the unsaturated compound has a branched structure and 5–7 carbon atoms as a whole. Further, according to the present invention, the solvent may only contain the aliphatic hydrocarbon having 5–7 carbon atoms and a branched structure, or may also contain other organic solvent components.

The aliphatic hydrocarbon having 5–7 carbon atoms and a branched structure is added at a ratio of 100–2000 weight parts to 100 weight parts of the alkylene oxide, and more preferably of 200–1000 weight parts. When the solvent only includes the aliphatic hydrocarbon having 5–7 carbon atoms and a branched structure, if the amount of addition is less than 100 weight parts, it becomes difficult to stir the produced alkylene oxide polymers uniformly, which can lead the polymers to take undesirable forms. On the contrary, if the amount of addition exceeds 2000 weight parts, production efficiency per unit volume can decrease. However, if the solvent for polymerization reaction is provided by a mixture of the aliphatic hydrocarbon having 5–7 carbon atoms and a branched structure and other organic solvent, the aliphatic hydrocarbon having 5–7 carbon atoms and a branched structure may be less than 100 weight parts, provided that a total amount of the solvent is in the range of 100–200 weight parts with respect to 100 weight parts of the alkylene oxide.

The catalyst for use according to the present invention can be any of alkalis, $SnCl_4$, $BF_3$, oxides of alkali earth metals, oxides of Zn, metal alkoxides and organic metal compounds of Zn or Fe and zinc compounds obtained by reaction between an organic zinc compound and alcohol.

Further, the process of production according to the present invention can also use a catalyst disclosed in the Japanese Patent Laid-Open No. 5-17566 (This document is included as part of the disclosure made by the present specification.) This catalyst is a zinc compound obtained by reaction between an organic zinc compound and alcohol. Specifically, this zinc compound catalyst can be obtained as follows: First, an organic zinc compound such as diethyl zinc is reacted with 0.2–1.1 equivalent of an aliphatic polyhydric alcohol such as butanediol, and then with more than 0.1 equivalent of a monohydric alcohol such as ethyl alcohol. Thereafter, the resulted solvent is heated at 80–200° C. Dosage for this catalyst is 0.01–1 mol % based on zinc atom to 1 mol of alkylene oxide. If the amount is less than 0.01 mol %, it becomes difficult to obtain the polymers at a high reproducibility. Use of the catalyst in excess of 1 mol % does not produce reasonably rewarding effects but tends to reduce molecular weight of the produced polymers or to increase the amount of catalyst remaining in the polymers.

Reaction temperature in the process of production according to the present invention varies depending on the kind of alkylene oxide and its concentration, the kind of catalyst and its concentration, etc. In general, however, the temperature is 20–100° C., and more preferably, 30–60° C. Time necessary for the reaction depends on the reaction temperature, but according to the present invention, the alkylene oxide polymerization reaction proceeds quickly and comes to an end generally in 30–240 minutes.

BEST MODE FOR CARRYING OUT THE INVENTION

Hereinafter, examples of the present invention will be described with references. The scope of protection to the present invention is not limited by these examples.

EXAMPLE 1

Catalyst Preparation

First, nitrogen displacement operation was performed to a 200 cm$^3$ four-necked flask equipped with a stirrer, a cooling tube and a dropping funnel.

Next, a mixed solution was prepared by adding in this flask 18.3 grams of 2-methyl pentane (manufactured by Wako Pure Chemical Industries Ltd.) as a solvent, 47.7 grams of a high boiling-point aliphatic hydrocarbon (brand name: No. 0 solvent, manufactured by Nippon Oil Corporation), and 7.4 grams (0.06 mol) of diethyl zinc (manufactured by Nihon Tokushu Kagaku Kogyo Ltd.)

Next, 4.3 grams of 1,4-butanediol was dripped slowly, spending an hour, to the mixed solution while the solution was vigorously stirred at 10° C. After the dripping was finished, the mixture was stirred at 30° C. for an hour to allow reaction, and then stirring was continued at 50° C. for an hour to allow reaction.

Next, while the solution was kept at a temperature of 20° C., 3.6 grams of ethyl alcohol (manufactured by Japan Alcohol Trading Co., Ltd.) was dripped slowly, spending an hour. After the dripping was over, the mixture was kept at 40° C. while being stirred to allow reaction, and then heated at 140° C. for 20 minutes. During this, components which had not reacted were distilled thereby removed. As a result, 56.5 grams of fairly thick and viscous white liquid catalyst was obtained.

Production of Alkylene Oxide Polymers

Nitrogen displacement was performed to a 1000 cm$^3$ pressure container. To this container were added 345 grams of 2-methyl pentane (manufactured by Wako Pure Chemical Industries Ltd.) as a solvent and 0.47 grams of the obtained catalyst (containing 0.5 mmol zinc). The mixture was stirred to dissipate the catalyst uniformly in the solvent.

Next, 84 grams (1.91 mol) of ethylene oxide (manufactured by NIPPON SHOKUBAI Co., Ltd.) was added. Then, the container was tightly plugged and bathed in a thermostat at 40° C. for two hours under stirring, to allow polymerization reaction.

After the polymerization reaction was over, a white product was filtrated from the solvent and was dried at 40° C. for five hours under vacuum, to obtain 81 grams of polyethylene oxide (polymerized ethylene oxide). According to the present embodiment, yield of polyethylene oxide with respect to ethylene oxide was 96.4%.

EXAMPLE 2

Nitrogen displacement was performed to a 1000 cm$^3$ pressure container. To this container were added 345 grams of 3-methyl pentane (manufactured by Wako Pure Chemical Industries Ltd.) as a solvent, and 0.47 grams of the catalyst (containing 0.5 mmol zinc) obtained in Example 1. The mixture was stirred to dissipate the catalyst uniformly in the solvent.

Next, 84 grams (1.91 mol) of ethylene oxide (manufactured by NIPPON SHOKUBAI Co., Ltd.) was added. Then, the container was tightly plugged and bathed in a thermostat at 40° C. for two hours under stirring, to allow polymerization reaction.

After the polymerization reaction was over, a white product was filtrated from the solvent and was dried at 40° C. for five hours under vacuum, to obtain 77 grams of polyethylene oxide. According to the present embodiment, yield of polyethylene oxide with respect to ethylene oxide was 91.7%.

EXAMPLE 3

Nitrogen displacement was performed to a 1000 cm$^3$ pressure container. To this container were added 345 grams of 2-methyl pentane (manufactured by Wako Pure Chemical Industries Ltd.) as a solvent and 0.94 grams of the catalyst (containing 1.0 mmol zinc) obtained in Example 1. The mixture was stirred to dissipate the catalyst uniformly in the solvent.

Next, were added 75 grams (1.70 mol) of ethylene oxide (manufactured by NIPPON SHOKUBAI Co., Ltd.) and 11 grams (0.19 mol) of propylene oxide (manufactured by Nihon Oxirane Co., Ltd.). Then, the container was tightly plugged and bathed in a thermostat at 40° C. for two hours under stirring, to allow polymerization reaction.

After the polymerization reaction was over, a white product was filtrated from the solvent and was dried at 40° C. for five hours under vacuum, to obtain 77 grams of ethylene oxide/propylene oxide copolymers. According to the present embodiment, yield of ethylene oxide/propylene oxide copolymers with respect to ethylene oxide/propylene oxide was 89.5%.

EXAMPLE 4

Nitrogen displacement was performed to a 1000 cm$^3$ pressure container. To this container were added 345 grams of 2,3-dimethyl pentane (manufactured by Wako Pure Chemical Industries Ltd.) as a solvent and 0.47 grams of the catalyst (containing 0.5 mmol zinc) obtained in Example 1. The mixture was stirred to dissipate the catalyst uniformly in the solvent.

Next, 84 grams (1.91 mol) of ethylene oxide (manufactured by NIPPON SHOKUBAI Co., Ltd.) was added. Then, the container was tightly plugged and bathed in a thermostat at 40° C. for two hours under stirring, to allow polymerization reaction.

After the polymerization reaction was over, a white product was filtrated from the solvent and was dried at 40° C. for five hours under vacuum, to obtain 76 grams of polyethylene oxide. According to the present embodiment, yield of polyethylene oxide with respect to ethylene oxide was 90.5%.

EXAMPLE 5

Nitrogen displacement was performed to a 1000 cm$^3$ pressure container. To this container were added 345 grams of 2,4-dimethyl pentane (manufactured by Aldrich Chemical Co.) as a solvent and 0.47 grams of the catalyst (containing 0.5 m mol zinc) obtained in Example 1. The mixture was stirred to dissipate the catalyst uniformly in the solvent.

Next, 84 grams (1.91 mol) of ethylene oxide (manufactured by NIPPON SHOKUBAI Co., Ltd.) was added. Then, the container was tightly plugged and bathed in a thermostat at 40° C. for two hours under stirring, to allow polymerization reaction.

After the polymerization reaction was over, a white product was filtrated from the solvent and was dried at 40° C. for five hours under vacuum, to obtain 76 grams of polyethylene oxide. According to the present embodiment, yield of polyethylene oxide with respect to ethylene oxide was 90.5%.

[Reference 1]

In making this reference, the same steps of operation as in Example 1 were followed using isooctane (manufactured by Wako Pure Chemical Industries Ltd.) in place of 2-methyl pentane, and 25 grams of polyethylene oxide was obtained. In this reference, yield with respect to ethylene oxide was 29.8%.

[Reference 2]

In making this reference, the same steps of operation as in Example 1 were followed using n-hexane (manufactured by Wako Pure Chemical Industries Ltd.) in place of 2-methyl pentane, and 24 grams of polyethylene oxide was obtained. In this reference, yield to ethylene oxide was 28.6%.

[Evaluation]

From the above, it will be understood that alkylene oxide polymers are obtained more efficiently according to the present invention, as compared to a process using isooctane which is an eight-carbon aliphatic hydrocarbon having a branch structure or to a process using n-hexane which is a six-carbon straight chain aliphatic hydrocarbon. Such an advantageous effect is attributable to a branch-structured aliphatic hydrocarbon having 5–7 carbon atoms in the reaction system utilized according to the present invention, which presumably promotes polymerization reaction of alkylene oxide.

What is claimed is:

1. A process for production of alkylene oxide polymers, wherein an alkylene oxide is subjected to a polymerization reaction in the presence of a catalyst in a solvent containing an aliphatic hydrocarbon having from five to seven carbon atoms and a branched structure;

wherein the aliphatic hydrocarbon is at least one selected from a group consisting of 2-methyl pentane, 3-methyl pentane, 2,3-dimethyl pentane and 2,4-dimethyl pentane; and wherein the catalyst comprises a zinc compound obtained by reaction between an organic zinc compound and alcohol.

2. The process according to claim 1, wherein the solvent contains only the aliphatic hydrocarbon having from five to seven carbon atoms and a branched structure.

3. The process according to claim 1, wherein the solvent contains another organic solvent component in addition to the aliphatic hydrocarbon having from five to seven carbon atoms and a branched structure.

4. The process according to claim 1, wherein the alkylene oxide is at least one selected from a group consisting of ethylene oxide, propylene oxide, butylene oxide, cyclohexene oxide, styrene oxide, epichlorohydrin and glycidylether epoxide compounds.

5. The process according to claim 4, wherein the aikylene oxide is at least one of ethylene oxide and propylene oxide.

6. The process according to claim 1, wherein the aliphatic hydrocarbon is added at a ratio of 100–2000 weight parts to 100 weight parts of the alkylene oxide.

7. The process according to claim 1, wherein the polymerization of alkylene oxide is carried out at a reaction temperature of 20–100° C.

* * * * *